Sept. 12, 1950

L. W. PARKER 2,521,741

DEFLECTION CIRCUIT

Filed Feb. 20, 1946

INVENTOR.
LOUIS W. PARKER

BY

R P Morris
ATTORNEY

Patented Sept. 12, 1950 2,521,741

UNITED STATES PATENT OFFICE

2,521,741

DEFLECTION CIRCUIT

Louis W. Parker, Jackson Heights, N. Y., assignor to Federal Telephone and Radio Corporation, New York, N. Y., a corporation of Delaware

Application February 20, 1946, Serial No. 649,062

4 Claims. (Cl. 315—27)

1

This invention relates to coil circuits and more particularly to improving the linearity of their magnetic fields over a range of energizing voltages, and it further relates to the application of such improvements to cathode tube deflection circuits.

It is customary to employ magnetic deflection circuits for cathode ray tubes which operate on the basis that a desired saw-tooth current wave is generated and is applied across the deflection coils or the yoke through an amplifier and output transformer. Both the amplifier and the output transformer are prone to distort the applied voltage wave, the deflection thereby ceasing to be linear.

It is an object of this invention to provide a deflection circuit of the type referred to wherein the inherent non-linearity may be considerably reduced.

It is also an object to control the relative linearity of such deflection circuits by the introduction of an automatic self-controlling voltage.

In accordance with the invention, I provide a saw-tooth deflection voltage generator which may be triggered as to frequency by an outside synchronizing source. The resulting saw-tooth deflection voltage is applied to the deflection coils of a cathode ray oscilloscope through an output transformer circuit which includes a power amplifier. Closely coupled to the deflection coils, I provide a pick-up coil which has the function of providing a correcting voltage to one of the grids of the power amplifier in accordance with the rate of change of the magnetic field in the deflection coil. A potentiometer is provided in the circuit of one of the grids of the power amplifier to regulate the constant bias thereon which is connected with the pick-up coil in such a way as to oppose the voltages thereof. The action of the circuit is such that the voltage from the pick-up coil, or rather the difference of the pick-up coil and potentiometer voltages, will tend to oppose any deviation from an existing rate of change of the magnetic field in the deflection coil by suitably controlling the power amplifier.

Figure 1:
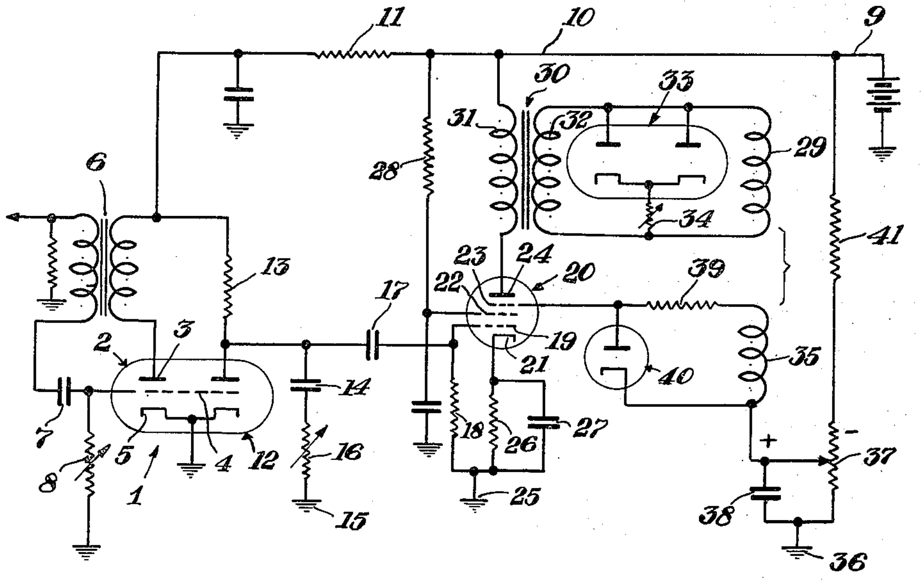
Figure 2:
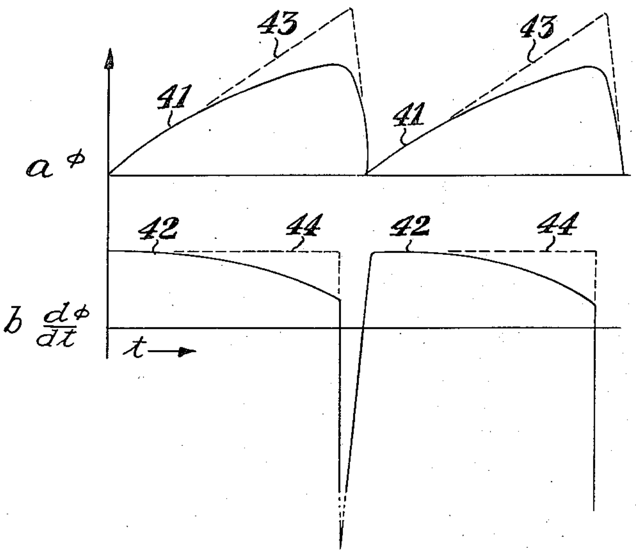

A better understanding of my invention and the objects and features thereof may be had from a particular description of an embodiment thereof made with reference to the accompanying drawings, in which:

Fig. 1 is a representation in schematic form of a circuit diagram showing a deflection circuit incorporating my invention; and Fig. 2 is a representation in graph form of

2 certain operating conditions of the circuit of Fig. 1.

Referring to the circuit diagram, a blocking oscillator is shown at 1 which is comprised of a triode 2 having a plate 3, a grid 4 and a cathode 5. The anode 3 is closely coupled to the grid 4 through a transformer 6 which also serves as an input circuit from a source of synchronizing pulses which has not been shown. The grid 4 has been provided with a grid leak consisting of a condenser 7 and an adjustable resistance 8. The anode 3 receives an energizing potential from a source of potential at 9 over a connection 10 and a dropping resistance 11. The discharge impulses of the blocking oscillator 1 are impressed on a discharge tube 12 which is also a triode having its cathode and grid tied together respectively with those of the tube 2, and its anode supplied from the source of B+ potential 9 over the dropping resistance 11 and a potential anode resistance 13. The discharge tube 12 serves to charge up a condenser 14 which is connected to ground at 15 over an adjustable resistance 16, the latter serving to determine the rate of discharge of the condenser 14. The resulting saw-tooth type voltage is applied over a coupling circuit comprised of a condenser 17 and a resistance-to-ground 18 to a control grid 19 of a pentode power amplifier 20. The pentode further includes a cathode 21, a screen grid 22, a suppressor grid 23 and an anode 24. The cathode 21 is grounded at 25 through a cathode resistance 26 and a by-pass condenser 27. A suitable bias is maintained on the screen grid 22 as supplied from the source of potential at 9 over a dropping resistance 28. The output of the amplifier 20 is applied to a magnetic deflection coil or yoke 29 by way of an output transformer 30 having primary and secondary windings, 31 and 32 respectively. The primary 31 also serves as a path for the anode potential to the plate 24 from the potential source at 9. In the circuit between the secondary 32 and the deflection coil 29 there is provided a double diode rectifier 33 which is connected from one side of the coil 29 to the other through an adjustable resistance 34, the rectifier serving the purpose of damping any possible self oscillation in the yoke circuit. In close proximity to the deflection coil 29, preferably located directly on the yoke for close magnetic coupling therewith, a pick-up coil 35 is provided. The coil 35 is on one side connected to ground at 36 in part through a potentiometer 37 and through a by-pass condenser 38. The other side of the coil 35 is connected to the suppressor grid 23 of the amplifier 20 over a resistance 39. Connected across the circuit made up of the resistance 39 and the pick-up coil 35 in series is provided a diode rectifier 40, the functions of which will appear hereinafter. The potentiometer 37 is connected to the source of potential at 9 by way of a dropping resistance 41.

The voltage across the pick-up coil 35 is the true derivative of the magnetic field variation with respect to time. That is $$E_d = K\frac{d+\phi}{dT}$$

where $E_d$ is the generated voltage across coil 35, K is a constant dependent on the geometry of the coil, $\phi$ is the instantaneous magnetic field and T is time. If the rate of change of $\phi$ is uniform, that is when the sweep is linear, the value of $$K\frac{d\phi}{dT}$$

is constant. This means that there is a steady D. C. potential across the coil during that part of the cycle. If, however, the rate of change drops (which is a usual occurrence), the D. C. potential across the coil 35 will also drop. This last condition is shown in Fig. 2 where the solid line 41 in graph *a* is the magnetic field with the dropping rate of change and the resulting differential representing the voltage across coil 35 is the solid line 42 shown in graph *b*. The desired magnetic field variation is illustrated by the dotted line 43 in Fig. 2*a* and the desired differential thereof is illustrated by the dotted curve 44 in Fig. 2*b*.

The circuit shown in Fig. 1 uses the voltage across coil 35 to oppose a D. C. potential obtained through potentiometer 37. If the rate of change of the magnetic field is uniform throughout the operating portion of the sweeping cycle, the D. C. across this coil is just enough to oppose the D. C. potential across the potentiometer. Therefore, if these two opposing potentials are applied between the suppressor grid and cathode of the power pentode tube nothing unusual happens. But if the rate of change of the magnetic field drops, the D. C. potential across coil 35 will not neutralize the effect of the steady potential of the potentiometer. Therefore the suppressor will become positive with respect to the cathode. This tends to increase the plate current.

The plate current, however, cannot be compensated exactly since this would raise the voltage across coil 35 to the point where it would eliminate the positive charge on the suppressor. By having two voltages of a high enough value to oppose one another, however, it is possible to create enough difference between them to control the suppressor grid even when this difference is a very small percentage of the total voltage. In this way the variation in the rate of change may be reduced by a large factor.

It may be noted that the system also has a stabilizing influence since it opposes any change of condition. At the end of the cycle, however, such change will be necessary; therefore the rectifier tube 40 is connected up in such manner that during the return sweep it will short circuit the coil 35 taking it out of operation for that time. The provision of resistance 39 makes it impossible for coil 35 to slow down the change of the magnetic field by loading during return time.

A steady positive potential will be applied to the suppressor grid from potentiometer 37 during the return time. This will not affect the shutting off of the output tube plate current materially.

In order to prevent the suppressor grid from drawing current, the steady potential at the potentiometer 37 may be reduced to the point where the voltage across the coil 35 is equal to it at the lowest value of this voltage. In this way the suppressor never becomes positive during the operating portion of the cycle. This may be necessary since any current drawn through the coil 35 will change the voltage across it from the true derivative.

It will be seen from the above that I have provided an effective system for correcting automatically the inherent non-linearity of magnetic deflection circuits in accordance with the objects set forth hereinabove.

While the above is a description of the principles of this invention in connection with specific apparatus, it is to be clearly understood that this description is made only by way of example and not as a limitation on the scope of this invention.

I claim:

1. For use with a cathode ray tube, a magnetic deflection field supply circuit comprising a magnetic deflection coil and a source of static potential, vacuum tube, means for supplying a deflection voltage to said coil, a pick-up coil magnetically coupled to said deflection coil for applying a correction voltage to said voltage supplying means and a unilaterally conducting means connected to said pick-up coil and to a portion of said static potential whereby changes from given conditions in said deflection coil are opposed, said voltage supplying means including a pentode power amplifier having a suppressor grid, and said pick-up being arranged to supply a corrective bias to said grid in accordance with the rate of change in the magnetic field of said deflection coil and said portion of said static potential being applied to said suppressor grid in polarity opposition to said corrective bias.

2. A magnetic deflection field supply circuit comprising a sawtooth type voltage generator, a pentode for amplifying the output of said generator, a magnetic deflection coil, a circuit coupling said pentode and said coil, a pick-up coil coupled to said deflection coil having one side thereof connected to a grid of said pentode, and a steady potential potentiometer grounded at one side and unilaterally connected to the other side of said pick-up coil to oppose potentials therefrom with respect to ground.

3. A circuit according to claim 2, further including means for damping self-oscillation in said coupling circuit.

4. A circuit according to claim 2, further including triode means for shorting out said pick-up coil during the return portion of the sawtooth sweep cycle.

LOUIS W. PARKER.

REFERENCES CITED

The following references are of record in the file of this patent:

UNITED STATES PATENTS

| Number | Name | Date |
|---|---|---|
| 2,077,574 | Maloff | Apr. 20, 1937 |
| 2,280,733 | Tolson | Apr. 21, 1942 |
| 2,309,672 | Schade | Feb. 2, 1943 |
| 2,320,551 | Bahring | June 1, 1943 |